United States Patent
Parker (10) Patent No.: US 6,944,793 B1
(45) Date of Patent: Sep. 13, 2005

(54) METHOD OF REMOTE MONITORING

(75) Inventor: David Parker, Redwood City, CA (US)

(73) Assignee: Red Hat, Inc., Raleigh, NC (US)

( * ) Notice: Subject to any disclaimer, the term of this patent is extended or adjusted under 35 U.S.C. 154(b) by 565 days.

(21) Appl. No.: 10/020,535

(22) Filed: Oct. 29, 2001

(51) Int. Cl.$^7$ ............................................. G06F 11/00
(52) U.S. Cl. ........................... 714/25; 714/47; 702/188
(58) Field of Search ................... 714/4, 25, 31, 714/48, 47; 702/188

(56) References Cited

U.S. PATENT DOCUMENTS

| | | | |
|---|---|---|---|
| 5,442,791 A | 8/1995 | Wrabetz et al. | |
| 5,506,955 A | 4/1996 | Chen et al. | |
| 5,511,185 A | 4/1996 | Weinbaum et al. | |
| 5,539,907 A | 7/1996 | Srivastava et al. | |
| 5,710,724 A | 1/1998 | Burrows | |
| 5,918,004 A | 6/1999 | Anderson et al. | |
| 6,023,507 A | 2/2000 | Wookey | |
| 6,263,457 B1 | 7/2001 | Anderson et al. | |
| 6,411,678 B1 * | 6/2002 | Tomlinson et al. | 379/1.01 |
| 6,438,711 B2 * | 8/2002 | Woodruff | 714/27 |
| 6,718,376 B1 * | 4/2004 | Chu et al. | 709/223 |
| 6,738,933 B2 * | 5/2004 | Fraenkel et al. | 714/47 |
| 2002/0177453 A1 * | 11/2002 | Chen et al. | 455/466 |
| 2003/0065986 A1 * | 4/2003 | Fraenkel et al. | 714/47 |

* cited by examiner

*Primary Examiner*—Scott Baderman
*Assistant Examiner*—Anne L Damiano
(74) *Attorney, Agent, or Firm*—Blakely, Sokoloff, Tayler & Zafman LLP (57) ABSTRACT

A method and apparatus is described for remote monitoring of digital processing systems. A remote monitoring digital processing system may be connected to one or more digital processing systems to be monitored. A diagnostic program may be executed on the remote monitoring digital processing system to generate diagnostic information relating to each monitored digital processing system.

14 Claims, 5 Drawing Sheets

METHOD OF REMOTE MONITORING

FIELD OF THE INVENTION

This invention relates to the field of computer systems and, in particular, to remote monitoring of computer systems.

BACKGROUND OF THE INVENTION

Figure 1:
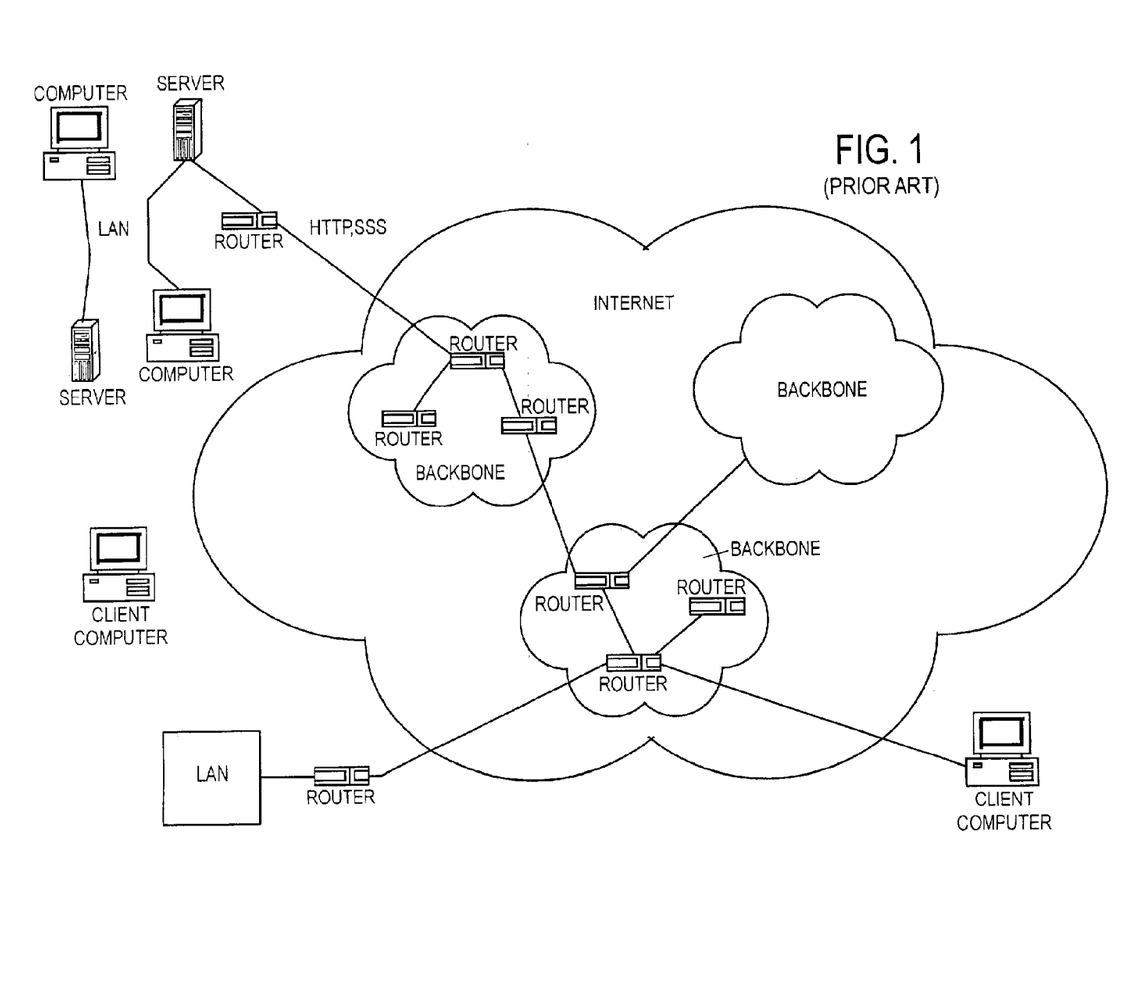
FIG. 1 illustrates a collection of computer systems interconnected by networks.

FIG. 1 illustrates a collection of computer systems (e.g., clients and servers) that are interconnected by public/private networks (e.g., transmission lines and routers) to enable the transfer of information among them. These systems are often modeled by their function: client-server. In the client-server model, communication generally takes the form of a request from the client to the server asking for an operation to be performed (e.g., request for data). The server performs the work and sends a reply. A client may then retrieve and display the requested information. However, a system may operate as both a server and a client. Client-server systems communicate with each other using a variety of network protocols, such as Transmission Control Protocol/Internet Protocol (TCP/IP) and Integrated Packet Exchange (IPX), and a variety of application protocols, such as HyperText Transfer Protocol (HTTP) and File Transfer Protocol (FTP).

A system may experience hardware or software failures that degrade system performance or render the system inoperative. In order to diagnose such failures, systems may include diagnostic capability that provides various types of diagnostic information relating to the system. Such diagnostic capability may consist of monitoring software running directly on each machine to be monitored. The software may run diagnostic tests, the results of which may be saved on the machine itself. Scheduling of such diagnostic tests may also be performed directly on the machine to be monitored.

The running of monitoring software directly on a system to be monitored may have adverse effects on that system. Continuous running of such monitoring software, for example, through use of an agent, may require significant use of system resources, for examples, memory space or processor time. Resources used by the monitoring software are thus resources that are not free for use by the system for other processes, for example, serving up web pages. In addition, the scheduling of diagnostic tests directly on a system to be monitored may also require system resources that further reduce the amount of free resources available for other system processes.

Another problem is that updates to and maintenance of monitoring software running directly on each system to be monitored must be performed directly on each system. This may result in additional strain on system resources, for examples, system memory and CPU load. Updates to the software may also result in system downtime, during which a user may be unable to access the system. Since each system to be monitored has its own copy of the monitoring software, each system may need to be individually updated, resulting in additional use of system resources and additional downtime. As such, software updates performed directly on each system may lead to a decrease in system performance. Since a large amount of code or a large number of files may need to be added or updated, there is also a possibility of the individual system crashing during the update. A system crash may cause other systems on the network to crash which, in turn, may further lead to a network-wide crash.

Some prior remote monitoring schemes used a master-slave configuration whereby one of the monitored systems is configured as a master system and the other monitored systems are configured as slave systems. The designated master system collects diagnostic information from each of the slave monitored systems and then sends the collected diagnostic information to a service center for analysis. This type of configuration may require a significant use of system resources to complete two machine connections (slave-to-master and master-to-service center) through which the diagnostic information is pushed. The process may also require a large amount of time to move the diagnostic information from a slave to the master and then from the master to the service center.

Another problem with such monitoring systems is the security of diagnostic information sent over a network. One of the most common methods of implementing security controls is encryption. In monitoring systems as those description above, encryption may either not be used at all or may be used at one of various levels of security. Among the highest levels of security are 16-bit encryption techniques and byte swapping algorithms. While these processes may provide higher levels of security than that of no encryption at all, the security offered may not be adequate to prevent against more sophisticated hackers.

BRIEF DESCRIPTION OF THE DRAWINGS

The present invention is illustrated by way of example, and not by way of limitation, in the figures of the accompanying drawings.

SUMMARY OF THE INVENTION

The present invention pertains to a method of and apparatus for remote monitoring of computer systems. In one embodiment, the apparatus may include a remote monitoring system, a remote probe residing within the remote monitoring system, and at least one system to be monitored. The remote monitoring system may be coupled with the monitored system through a secure connection.

In one embodiment, the method may include executing a diagnostic program on the remote monitoring system to generate diagnostic information relating to the monitored system. The method may include collecting within the remote monitoring system the diagnostic information. The method may also include interpreting the diagnostic information within the remote monitoring system.

Additional features and advantages of the present invention will be apparent from the accompanying drawings, and from the detailed description, which follows below.

DETAILED DESCRIPTION

In the following description, numerous specific details are set forth such as examples of specific operating systems, languages, security protocols, components, etc. in order to provide a thorough understanding of the present invention.

It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Figure 2:
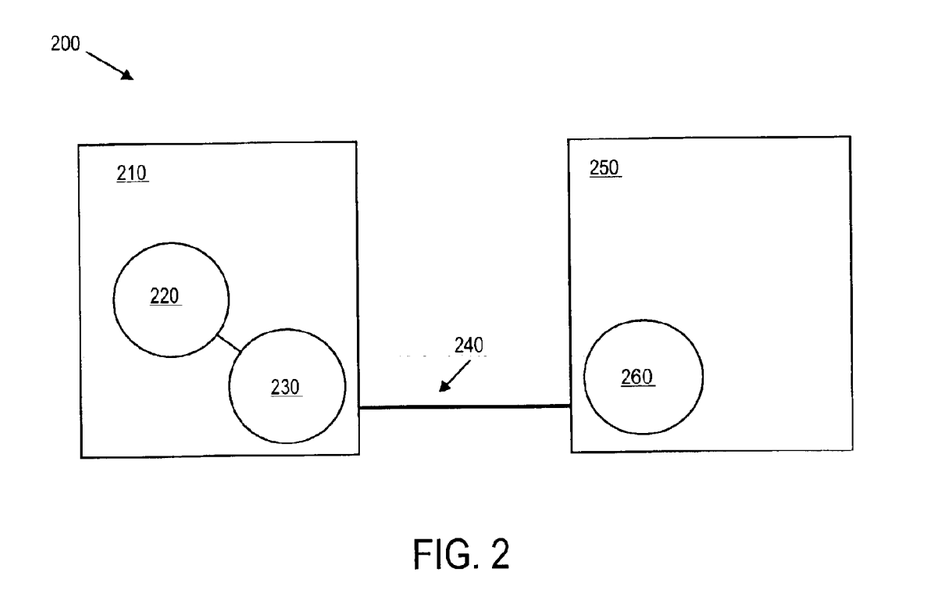
FIG. 2 illustrates one embodiment of a remote monitoring system.

FIG. 2 illustrates one embodiment of a remote computer monitoring system. Remote computer monitoring system 200 may include various hardware and software components to perform monitoring functions. Remote computer monitoring system 200 may include a remote monitoring system 210 and one or more monitored systems (e.g., monitored system 250) located remotely from remote monitoring system 210.

Remote monitoring system 210 and monitored system 250 may be coupled together through a secure connection 240. In one embodiment, the operating system of remote monitoring system 210 and monitored system 250 is UNIX. An operating system (OS) is a program that, after being initially loaded into a computer, manages application programs, for example, by setting rules for using memory, drives, and other computer components. In alternative embodiments, the operating system may be an operating system other than UNIX, for examples, LINUX, Windows NT, and Solaris.

In one embodiment, secure connection 240 is a SSH connection. SSH, or Secure Shell, is a UNIX-based command interface and protocol for securely gaining access to a remote computer. SSH provides for secure login to a remote machine, execution of commands on the remote machine, and movement of files from one machine to another. SSH provides strong authentication and secure communications through use of digital certificates and encryption. SSH may use RSA public key cryptography for connection and authentication, and it may use encryption algorithms such as Blowfish, DES, and IDEA.

A remote probe 230 may reside on remote monitoring system 210. Remote probe 230 is a program, or set of commands, that executes a diagnostic program within remote monitoring system 210 to generate diagnostic information relating to monitored system 250. In one embodiment, remote probe 230 may construct a string containing at least one command to be run on monitored system 250. Remote probe 230 may send the string through secure connection 240 to a daemon 260 residing on monitored system 250. A daemon is a program that runs continuously and exists for the purpose of handling periodic service requests that a computer system expects to receive. Daemon 260 may run the command on monitored system 250 and subsequently send resultant diagnostic information back to remote probe 230 through secure connection 240. In one embodiment, daemon 260 is an SSH daemon.

An agent, similar to a daemon, runs continuously and handles service requests a computer system expects to receive. An agent is in continuous communication with a system external to its host system, however, whereas a daemon does not need to be in continuous communication with an external system. Therefore, the use of a daemon in a remote computer monitoring system does not require as many system or network resources as would an agent. These resources may then be free to be used for other processes within the system or network. Also, the use of a daemon eliminates a dependency on an external system that may otherwise exist if an agent were used.

The use of a remote probe on the remote monitoring system may also free up system resources on a monitored system. Executing diagnostic software within a remote probe may require significantly less system resources from the monitored system than a remote computer monitoring system that involves running monitoring software directly on the monitored systems. These resources may thus be used for other processes by the monitored system. If multiple systems are to monitored, the aggregate amount of free resources that would otherwise be required for monitoring purposes may be significant, not only for each system, but also for any connecting networks.

The use of remote probes is also advantageous in terms of system upgrades and maintenance. If a remote computer monitoring system is to receive a software update, the update may only need to be performed on the remote monitoring system, as opposed to each individual monitored system. Also, routine maintenance may only need to occur on the remote monitoring system and not on each individual monitored system. This may prevent additional strain on the system resources for each monitored system. Correspondingly, a lower strain on system resources may minimize any risk of a system crash. The risk of a resultant network crash may also be minimized by a lower strain on system resources.

In one embodiment, remote probe 230 defines one or more commands to run for a particular operation system and application software (platform). Remote probe 230 may define different commands for different platforms on different remote monitored systems, as discussed below in relation to FIG. 3. A shell is group of code that describes the command or commands that is desired to be run when invoked. For example, to check free disk space on monitored system 250 using an SSH mechanism, remote probe 230 may use the following code:

```
sub setup {
    my $self = shift( );
    $self->set_probeCommands('/bin/df-k');
}
sub testResults {
    my $self = shift( );
    if ($self->exitLevel) {
        $self->setStatus('UNKNOWN');
        if ($self->stderr) {
            $self->addStatusString($self->stderr);
        }
    } else {
        my $fs = $self->get_fs_0;
        if ($self->stdout =~ /`$fs\s.*?(\d+)(%)?\s+\//sm) {
```

-continued

```
        my $pctUsed = $1;
        if ($pctUsed > $self->get_critical) {
            $self->setStatus('CRITICAL');
        } elsif ($pctUsed > $self->get_warn) {
            $self->setStatus('WARN');
        } else {
            $self->setStatus('OK');
        }
        $self->recordResult('fs_0->pctused',$self->get_fs_0,$pctUsed);
        $self->addStatusString("Filesystem".$self->get_fs_0."  is $pctUsed% used");
    } else {
        $self->setStatus('CRITICAL');
        $self->addStatusString("Filesystem".$self->get_fs_0." is not found");
    }
    }
}
```

The first subroutine, setup, describes the UNIX command df-k, which is a common command used to determine free space on a computer system. The second subroutine, testResults, gets called subsequent to execution of the command.

A scheduler 220 may also reside on the remote monitoring system 210. A scheduler is a program that determines when other programs, for example, diagnostic programs, are to be executed. Scheduled times at which programs are to be executed may be entered into scheduler 220, for examples, by another program or by a user. Scheduler 220 may be coupled with remote probe 230. In one embodiment, scheduler 220 is responsible for the scheduling of diagnostic programs to be executed by remote probe 230. Scheduling of diagnostic programs on the remote monitoring system 210 may allow for monitored system 250 to have available for use more of its system resources than might be available if such scheduling were performed on monitored system 250 itself.

Figure 3:
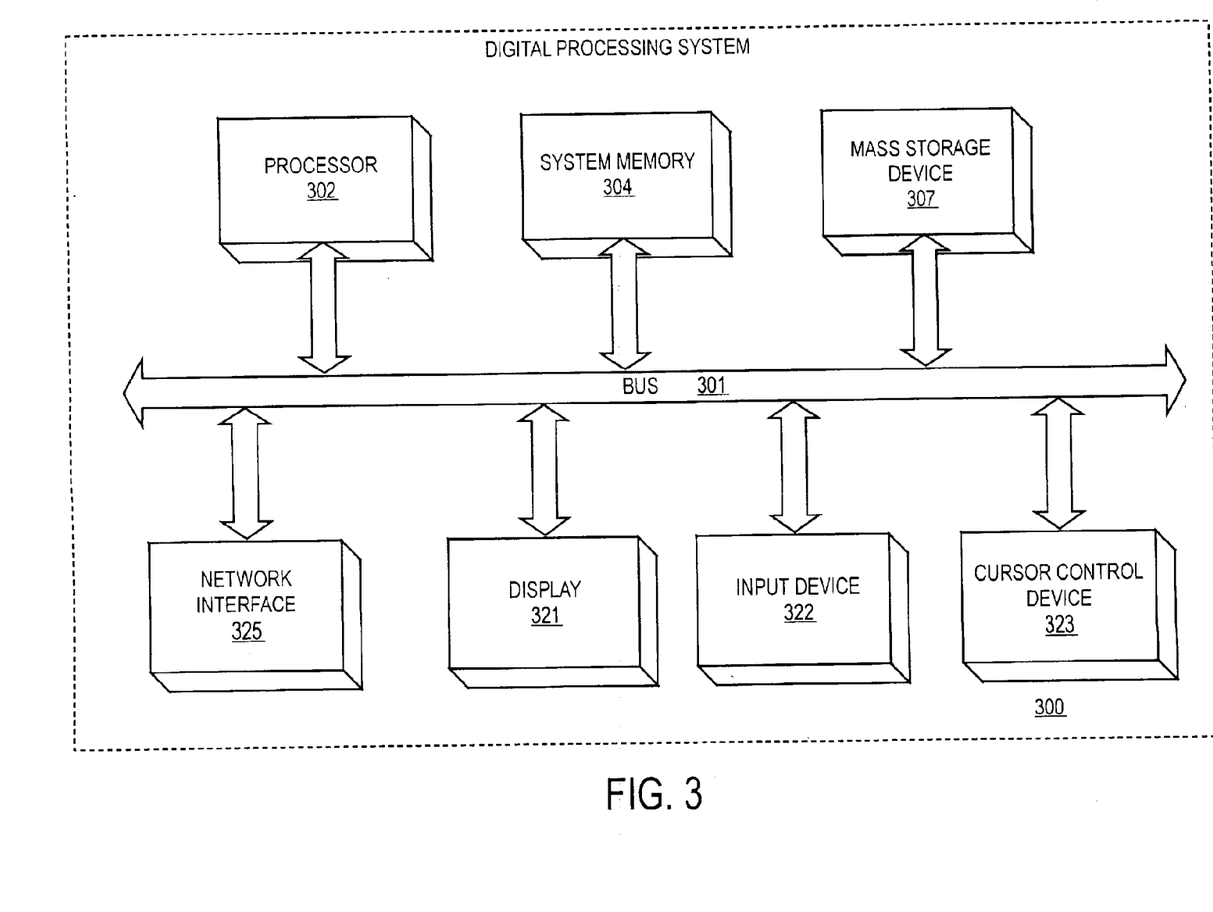
FIG. 3 illustrates one embodiment of a remote monitoring system in the form of a digital processing system.

FIG. 3 illustrates one embodiment of a remote computer monitoring system in the form of a digital processing system 300 representing an exemplary workstation, personal computer, server, etc., in which features of the present invention may be implemented.

Digital processing system 300 includes a bus or other communication means 301 for communicating information, and a processing means such as processor 302 coupled with bus 301 for processing information. Processor 302 may represent one or more processors such as a Motorola PowerPC processor or an Intel Pentium processor, etc. Digital processing system 300 further includes system memory 304 that may include a random access memory (RAM), or other dynamic storage device, coupled to bus 301 for storing information and instructions to be executed by processor 302. System memory 304 also may be used for storing temporary variables or other intermediate information during execution of instructions by processor 302. System memory 304 may also include a read only memory (ROM) and/or other static storage device coupled to bus 301 for storing static information and instructions for processor 302.

A data storage device 307 such as a magnetic disk or optical disc and its corresponding drive may also be coupled to digital processing system 300 for storing information and instructions. The data storage device 307 may be used to store instructions for performing the steps discussed herein. Processor 302 may be configured to execute the instructions for performing the steps discussed herein. In one embodiment, digital processing system 300 is configured to operate with a UNIX operating system stored on data storage device 307. In alternative embodiments, another operating system may be used, for examples, Windows NT, LINUX, and Solaris.

In one embodiment, digital processing system 300 may also be coupled via bus 301 to a display device 321, such as a cathode ray tube (CRT) or Liquid Crystal Display (LCD), for displaying information to the user. For example, graphical and/or textual depictions/indications of system performance characteristics, and other data types and information may be presented to the system administrator on the display device 321. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A network interface device 325 is also coupled to bus 301. Depending upon the particular design environment implementation, the network interface device 325 may be an Ethernet card, token ring card, or other types of interfaces for providing a communication link to a backbone of an IP network for which digital processing system 300 is monitoring.

It will be appreciated that the digital processing system 300 represents only one example of a system, which may have many different configurations and architectures, and which may be employed with the present invention. For example, some systems often have multiple buses, such as a peripheral bus, a dedicated cache bus, etc.

Figure 4:
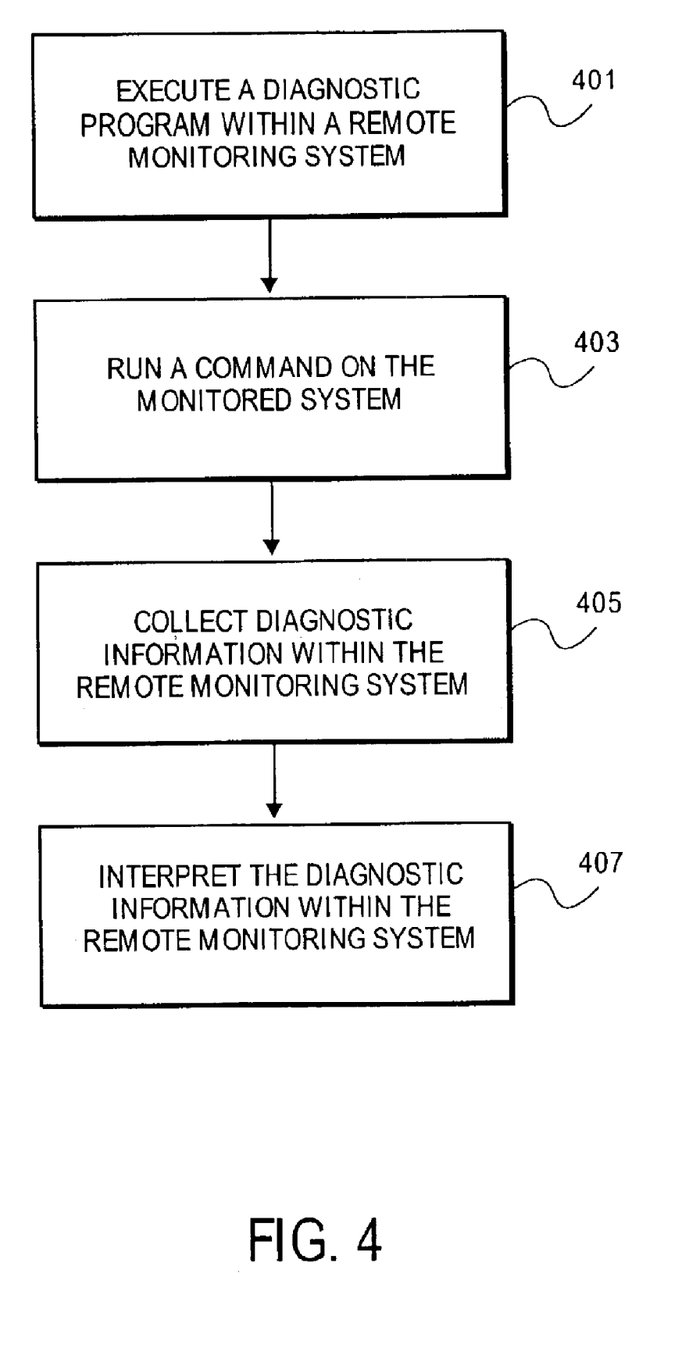
FIG. 4 illustrates one embodiment of a method of remote monitoring of computer systems.

FIG. 4 illustrates one embodiment of a method of remote monitoring of computer systems. A remote monitoring system may execute a diagnostic program at step 401 to generate diagnostic information relating to a monitored system. The diagnostic program may include running a command on the monitored system at step 403. Running the command may generate diagnostic information, which may be collected within the remote monitoring system at step 405. This diagnostic information may then be interpreted within the remote monitoring system at step 407.

Collecting within the remote monitoring system the diagnostic information relating to the monitored system is preferable to using a service center computer system. Whereas using a service center computer system makes for a two-step process in transporting the diagnostic information from a monitored system to a system where it can be analyzed, collecting the information directly within the remote monitoring system eliminates this middle step. As a result, less system resources are required and the time needed to move the diagnostic information is minimized. The aggregate effect of this decrease in required resources and time across a network may prove to be significant.

Diagnostic information relating to the monitored system may include information regarding disk space capacity and use, memory use, system load, or the number of processes currently running on the machine (process count). The diagnostic information may also include whether particular processes are running and, if so, whether they are running with errors. The number and types of network connections to the machine may also be included. Some of the diagnostic information may be located in various log files. These log files may include error messages, system messages, kernel messages, and any messages from other processes or devices, for examples, servers and daemons.

Figure 5:
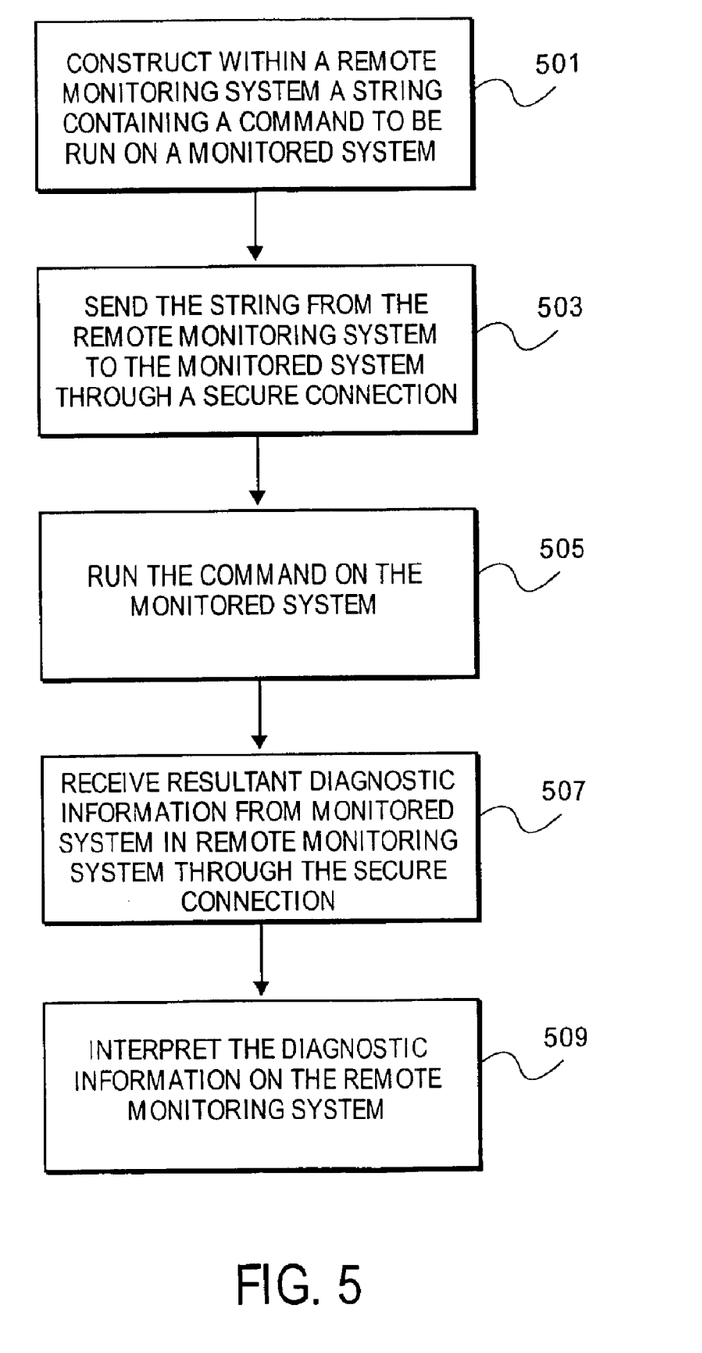
FIG. 5 illustrates one embodiment of executing a diagnostic program on a remote system to generate diagnostic information relating to a monitored system.

FIG. 5 illustrates one embodiment of executing a diagnostic program on a remote system to generate diagnostic information relating to a monitored system. Initially, at 501, a string may be constructed within a remote monitoring system. In one embodiment, a remote probe residing within the remote monitoring system may construct the string. The string may contain at least command to be run on a monitored system. In one embodiment, the string may be a single command line. Alternatively, the string may be a shell script.

The string may be sent from the remote monitoring system to the monitored system at 503. In one embodiment, the string is sent through a secure connection, for example, an SSH connection. The string may be sent from a remote probe residing on the remote monitoring system to the monitored system. The monitored system may run the command within the string at 505. In one embodiment, the command may be run through use of a daemon residing on the monitored system, for example, an SSH daemon.

The remote monitoring system may receive resultant diagnostic information from the monitored system at 507. In one embodiment, the diagnostic information may be sent through a secure connection, for example, an SSH connection. The diagnostic information may be sent from a daemon residing on the monitored system. The remote monitoring system may interpret the diagnostic information relating to the remote monitoring system at 509. In one embodiment, a remote probe residing on the remote monitoring system interprets the diagnostic information.

The method and apparatus for remote monitoring of computer systems as described above may require less system resources, thereby allowing more resources free for use with other applications. Since diagnostic software may be run on a remote monitoring system as opposed to a monitored system itself, less resources on the monitored system will be required. Similarly, since scheduling may be done within the remote monitoring system rather than the monitored system, a greater amount of resources within the monitored system will be free for use by other applications.

System updates and maintenance may also put less of a strain on resources of monitored systems. Since copying and updating of files may occur on the remote monitoring system rather than each individual monitored system, more resources will be free on each monitored system. This may lead to a decreased risk in system crashes and possibly also resultant network crashes.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
    connecting at least one remote monitoring digital processing system to at least one monitored digital processing system, wherein connecting comprises establishing a secure connection between the remote digital processing system and the monitored digital processing system; and
    executing at least one diagnostic program from the remote monitoring digital processing system to run a command on the monitored system to generate diagnostic information relating to the monitored digital processing system, wherein executing comprises:
        constructing, within a remote probe residing on the remote monitoring digital processing system, at least one string containing at least one command to be run on the monitored digital processing system;
        sending the string from the remote monitoring digital processing system to the monitored digital processing system; and
        running the command on the monitored digital processing system, wherein running the command comprises running the command within a daemon residing on the monitored digital processing system.

2. The method of claim 1, wherein establishing a secure connection comprises establishing a connection using Secure Shell.

3. The method of claim 1, wherein sending comprises sending the string from the remote probe to the monitored digital processing system through the secure connection.

4. The method of claim 1, wherein the daemon is a Secure Shell daemon.

5. The method of claim 1, further comprising collecting within the remote monitoring digital processing system the diagnostic information relating to the monitored digital processing system.

6. A method comprising:
    establishing a secure connection between a remote digital processing system and a monitored digital processing system;
    executing at least one diagnostic program on the remote digital processing system to generate diagnostic information relating to the monitored digital processing system by constructing within a remote probe residing on the remote monitoring digital processing system at least one string containing at least one command to be run on the monitored digital processing system; and
    collecting within the remote probe residing on the remote monitoring digital processing system the diagnostic information relating to the monitored digital processing system.

7. The method of claim 6, further comprising interpreting within the remote monitoring digital processing system the diagnostic information.

8. A method comprising:
    establishing a secure connection between a remote digital processing system and a monitored digital processing system;
    executing at least one diagnostic program on the remote digital processing system to generate diagnostic information relating to the monitored digital processing system by constructing within a remote probe residing on the remote monitoring digital processing system at least one string containing at least one command to be run on the monitored digital processing system;
    collecting within the remote monitoring digital processing system the diagnostic information relating to the monitored digital processing system; and
    interpreting within the remote probe residing on the remote monitoring digital processing system the diagnostic information.

9. An apparatus, comprising:
    a scheduler residing on a remote monitoring digital processing system;
    a command residing on the remote monitoring digital processing system to execute a diagnostic program within the remote monitoring system, wherein the command is operatively coupled with the scheduler; and
    a monitored digital processing system coupled with the remote monitoring digital processing system; and
    a daemon residing on the monitored digital processing system.

10. The apparatus of claim 9, wherein the daemon is a Secure Shell daemon.

11. The apparatus of claim 9, further comprising a UNIX operating system running on the remote monitoring digital processing system.

12. The apparatus of claim 9, wherein the monitored digital processing system is coupled with the remote monitoring digital processing system through a secure connection.

13. The apparatus of claim 12, wherein the secure connection is a Secure Shell connection.

14. The apparatus of claim 12, further comprising at least one string to be sent from and to the monitored digital processing system through the secure connection, the string containing at least one command to be run on the monitored digital processing system to generate diagnostic information relating to the monitored digital processing system.

* * * * *